United States Patent [19]

Ogiso et al.

[11] Patent Number: 5,800,912
[45] Date of Patent: Sep. 1, 1998

[54] HIGH GLOSS MOLDED RESIN

[75] Inventors: Koichi Ogiso; Hiroshi Mukai, both of Gifu-ken; Daiichiro Kawashima; Junji Koizumi, both of Aichi-ken; Katsushi Ito, Gifu-ken, all of Japan

[73] Assignee: Toyoda Gosei Co., Ltd., Neshekaugai, Japan

[21] Appl. No.: 551,008

[22] Filed: Oct. 31, 1995

[30] Foreign Application Priority Data

Oct. 31, 1994 [JP] Japan ............................. 6-292048
Mar. 1, 1995 [JP] Japan ............................. 7-068792
Mar. 1, 1995 [JP] Japan ............................. 7-068794
Mar. 1, 1995 [JP] Japan ............................. 7-068795

[51] Int. Cl.[6] ................................................. B32B 5/16
[52] U.S. Cl. ........................ 428/323; 428/324; 428/328; 428/330; 428/331; 428/515; 428/516; 428/518; 428/523; 428/911; 428/913
[58] Field of Search ........................... 428/515, 516, 428/518, 523, 911, 913, 323, 324, 328, 330, 331

[56] References Cited

PUBLICATIONS

Patent Abstracts of Japan, 114 C 693, JP-1-308441, Dec. 1989.
Patent Abstracts of Japan, 90 C 793, JP-2-255842, Oct. 1990.
Patent Abstracts of Japan, 128 C 777, JP-2-214744, Aug. 1990.
Patent Abstracts of Japan, 52 C 929, JP-4-7363, Jan. 1992.
Patent Abstracts of Japan, 2 M 1550, JP-5-278099, Oct. 1993.
Patent Abstracts of Japan, 40 C 384, JP-61-138652, Jun. 1986.
Abstracts of Japan, 74 C 691, JP-1-301748, Dec. 1989.
Abstracts of Japan, 93 C 319, JP-60-152543, Aug. 1985.
Abstracts of Japan, 109 C 447, JP-62-84142, Apr. 1987.
Abstracts of Japan, j-51-049264, Apr. 1976.

*Primary Examiner*—Leszek Kiliman, PhD
*Attorney, Agent, or Firm*—Cushman Darby & Cushman IP Group of Pillsbury Madison & Sutro LLP

[57] ABSTRACT

The present invention relates to a high gloss molded resin exhibiting high gloss, metallic luster, excellent weatherproofing and scratch resistance properties comparable to those of a coated product, thus eliminating a coating process; the high gloss molded resin comprising a core layer and a skin layer, the core layer formed of a polypropylene composite material, the skin layer formed of a mixture of a polypropylene resin and a coloring agent; the polypropylene resin used for the skin layer containing an amount of ethylene 6 wt. % or less, as well as exhibiting Rockwell hardness equal to or greater than 85.

21 Claims, 6 Drawing Sheets

Fig. 4

| DESCRIPTION | CHEMICAL FORMULA | CHARACTERISTIC |
|---|---|---|
| 1[2-[3-(3,5-di-tert-butyl-4-hydroxyphenyl) propyonyloxy]ethyl]-4-(3-(3,5-di-tert-butyl-4-hydroxyphenyl) propyonyloxy)-2,2-6,6-tetramethylpiperidine | | Appearance: White crystalline powder<br>Melting point: 135 – 140<br>MW: 722.1 |
| 2-methyl-2-(2,2,6,6-tetramethyl-4-piperidine) amino-N-(2,2,6,6-tetramethyl-4-piperdil) propionateamide | | Molecular weight: 380<br>Melting point: 125 |

Fig. 5

| DESCRIPTION | CHEMICAL FORMULA |
|---|---|
| polycondensate of succinic acid dimethyl-1-(2-hydroxyethyl)-4-hydroxy 2,2,6,6-tetramethylpiperidine | $\left[ H-O-\underset{H_3C}{\overset{H_3C}{\diagup}}\!\!\!\!\!\underset{CH_3}{\overset{CH_3}{\diagdown}}\!\!\!\!\!N-CH_2-CH_2-O-\overset{O}{\underset{\|}{C}}-CH_2-CH_2-\overset{O}{\underset{\|}{C}}-O-CH_3 \right]_n$<br>Molecular weight: 3100 – 4000 |
| poly[ 6-(1,1,3,3-tetramethyl butyl) imino-1,3,5-triazine-2,4-diyl] [ (2,2,6, 6-tetramethyl-4-piperidil)imino] hexamethylene [ (2,2,6,6 tetramethyl-4-piperidil)imino] ] | $NH+CH_2+$<br>Molecular weight: 2000 – 3300 |
| N,N'-bis(3-amino propyl)ethylene diamine-2,4-bis[N-butyl-N-(1,2,2,6,6-penta methyl-4 piperidil)amino]-6-chloro-1,3,5-triazine condensate<br>Present chemical compound No. (5)-5938<br>CAS-No.: 106990-43-6<br>65447-77-0 | R-NH-(CH$_2$)$_3$N-(CH$_2$)$_2$-N-(CH$_2$)$_3$-NH-R<br>R : H<br>Molecular weight: 2000 or more | bis(2,2,6,6-tetramethyl-4-piperidil)sebacate

Hindered phenol antioxidant
3,9-bis[2-[3-(3-tert-butyl-4-hydroxyl-5-methylphenyl)propionyloxy]-1,
1-dimethylethyl]-2,4,8,10-tetraoxaspiro[5- 5]undecane Phosphorous heat stabilizer
tris(2,4-di-t-butylphenyl)phosphite

HIGH GLOSS MOLDED RESIN

BACKGROUND OF THE INVENTION

1. Field of the Invention

The present invention relates to a molded resin suitable for use as an exterior trim part of an automobile, and, more particularly, to a molded resin exhibiting excellent high gloss.

2. Prior Art

A side molding and a bumper corner used as exterior trim parts of an automobile are required to have high gloss for an attractive external appearance. The exterior trim parts are usually formed of a molded resin in view of improving adaptability and contributing to the automobile's flexibility and strength.

The aforementioned molded resin is typically formed of a polypropylene resin containing glass fiber (hereinafter referred to as PPG), and an olefin composite material such as a polyolefin thermoplastic elastomer. Alternatively, the molded resin comprises a resin composition formed of a rubber modified polypropylene containing either a mixture of polypropylene and rubber or a mixture of polypropylene, rubber and filler.

The molded resin is typically coated with a metallic or solid coating on its surface in order to improve its gloss.

The above conventional high gloss molded resin has the following drawbacks. That is, the conventional molded resin requires a coating process which complicates the manufacturing process, resulting in cost increase.

One way of eliminating the coating process is by adding a pigment to the resin for coloring, however, the resultant product fails to meet the quality requirements for exterior trim parts.

Laid Open Japanese Patent Application Nos. 308441 (1989), 255842 (1990), 7363 (1992), 214747 (1990), 278099 (1993) and 13865 (1986), the disclosures of which are hereby incorporated by reference, disclose methods for improving the gloss and metallic luster of a colored resin by specifying the pigment component and pigment dispersion agent. Laid Open Japanese Patent Application Nos. 49264 (1976) and 301748 (1989), the disclosures of which are hereby incorporated by reference, disclose an improved method for manufacturing a colored resin. Laid Open Japanese Patent Application Nos. 152543 (1985) and 84142 (1987), the disclosures of which are hereby incorporated by reference, disclose the improved resin component.

None of the above prior art references provide a molded resin with high gloss and metallic luster comparable to a molded resin that is coated with a metallic or solid coating. By eliminating the coating process, it has not been previously possible to obtain a molded resin with high gloss and metallic luster comparable to a coated product. The resultant molded resin also has scratch resistance inferior to the coated product.

Rubber modified polypropylene is well known for excellent impact resistance compared to the above molded resin, however, it exhibits insufficient weather-proofing capability. Adding a weather stabilizer such as an ultraviolet light absorber and light stabilizer serves to enhance the weather-proofing capability. The weather stabilizer is useful for color tones with high optical cut-off ability such as black or dark gray. In the case of utilizing a weather stabilizer with known molded resins, for chromatic light colors such as red, blue, green, beige and light gray, however, it has been shown that the gloss of the molded resin decreased or the molded resin discolored after only one and a half years of outdoor exposure testing.

SUMMARY OF THE INVENTION

It is an object of the present invention to provide a molded resin exhibiting high gloss, metallic luster, excellent weather-proofing and scratch resistance properties, thus eliminating the need for a coating process.

This object and others are accomplished by the present invention which provides a high gloss molded resin formed of a core layer and a skin layer. The core layer is formed of a polypropylene composite material and the skin layer is formed of a mixture of a polypropylene resin and a coloring agent. The polypropylene resin of the skin layer contains an amount of ethylene about 6 wt. % or less and exhibits a Rockwell hardness equal to or greater than about 85.

BRIEF DESCRIPTION OF THE DRAWINGS

FIG. 4 depicts the chemical formulae of a first light stabilizer of the present invention.

FIG. 5 depicts the chemical formulae of a second light stabilizer of the present invention.

DETAILED DESCRIPTION OF THE INVENTION

Figure 1:
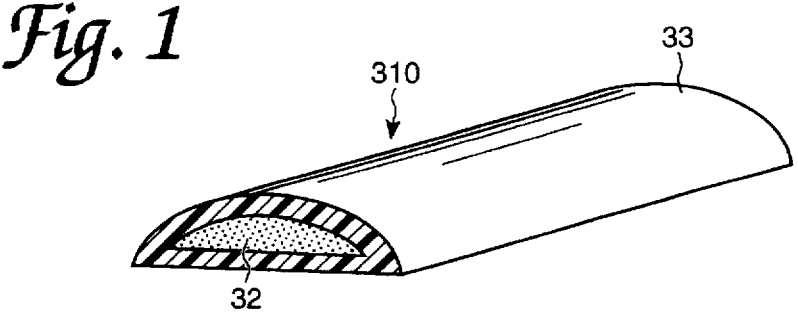
FIG. 1 is a partial cutaway view in perspective of a side molding as in Example 2.

The high gloss molded resin of the present invention comprises a core layer and a skin layer. The core layer is formed of a polypropylene composite material. The skin layer is formed of a mixture of a polypropylene resin and a coloring agent.

The polypropylene resin as the skin forming material contains an amount of ethylene (about 6 wt. % or less), and exhibits a Rockwell hardness of about 85 or greater.

The above-specified polypropylene resin provides the molded resin with high gloss, metallic luster, and scratch resistance comparable to a conventional coated product. In case the ethylene content exceeds about 6 wt. %, or its Rockwell hardness becomes less than 85, the resultant molded resin has insufficient high gloss, metallic luster and scratch resistance compared to a conventional coated product.

Suitable examples of the polypropylene resin as the skin-forming material include a crystalline homopolypropylene, crystalline propylene-ethylene random copolymer, crystalline propylene-ethylene block copolymer and mixtures thereof.

It is preferable to use a "high" crystalline polypropylene resin, defined as a crystalline polypropylene resin having a high isotactic index value (Rockwell hardness>=95), selected from the aforementioned skin-forming polypropylene resins. It is most preferable to use a high crystalline homopolypropylene resin (Rockwell hardness>=105), resulting in improved gloss, metallic luster and excellent scratch resistance properties. The isotactic index refers to the value of an isotactic ratio of a methyl group in a triad unit of the polypropylene resin measured through 13C-NMR method.

It is preferable that the polypropylene composite material as the core-forming material is compounded with either a rubber or an inorganic filler or both, thus providing flexibility and rigidity to the core layer.

Suitable examples of the polypropylene resin as the core-forming material include a homopolypropylene, block polypropylene, random polypropylene and mixtures thereof. Block polypropylene is the preferred polypropylene resin of the core-forming composite material.

Suitable examples of the rubber contained in the polypropylene composite material include an amorphous ethylene-α-olefin copolymer, and a styrene thermoplastic elastomer. This composition provides to the core layer appropriate flexibility as well as improved strength such as high impact resistance at low temperature.

Examples of the α-olefin component of the amorphous ethylene-α-olefin copolymer include: propylene, 1-butene, 1-pentene, 1-hexene, 1-octene, 4-methyl-pentene-1 and 1-heptene. Preferred α-olefin components are propylene and 1-butene. The styrene thermoplastic elastomer may be in the form of: Styrene Ethylene Butylene Styrene Block Copolymer (SEBS); Styrene Ethylene Propylene Styrene Block Copolymer (SEPS); Styrene Ethylene Propylene Block Copolymer (SEP); Styrene Ethylene Ethylene Propylene Styrene Block Copolymer (SEEPS); Styrene Butadiene Styrene Block Copolymer (SBS); and Styrene Isoprene Styrene Block Copolymer (SIS).

The inorganic filler is preferably one or more components selected from the group including: glass fiber, talc, mica, calcium carbonate, wollastonite, clay, barium sulfate, potassium titarate whisker, magnesium sulfate whisker, calcium carbonate whisker and silica. Talc is preferably used as the inorganic filler. The inorganic filler serves to improve the strength of the core layer such as impact resistance at a low temperature.

Either inorganics or organics are suitable for use as the coloring agent in the skin layer. Either chromatic or monochromatic color is applicable.

The inorganic coloring agent can include: titanium white, zinc oxide, zinc sulfide, blood red, chrome yellow, barium yellow, ultra marine blue, cobalt blue, cobalt green, carbon black, aluminum powder, aluminum flake, aluminum foil, pearl mice, zinc powder and bronze powder.

The organic coloring agent can include: watching red, permanent red, para red, toluidine maroon, benzidine yellow, phthalocyanine blue, phthalocyanine green, fast sky blue and brilliant carmine 6B. The above inorganic and organic coloring agents are chosen and mixed in amounts to produce a desired molded resin of suitable color.

The rigidity or flexibility of the molded resin is defined by the core-forming polypropylene composite material. The components of the skin layer can be selected in view of providing good appearance and scratch resistance without considering the strength requirement.

In one embodiment of the present invention, the skin layer is formed of a mixture of the above-specified polypropylene resin and the coloring agent.

The pigment of the skin layer is likely to migrate inwardly from the surface, resulting in a clear layer containing no coloring agent on the outermost surface of the skin layer. The high gloss molded resin of the present invention thus exhibits deep gloss comparable to that of a conventional coated product.

Since the skin layer is formed of the above specified polypropylene resins, its hardness is sufficient to protect the surface of the molding from scratches. Therefore, the molded resin of the present invention exhibits high gloss, metallic luster, and scratch resistance comparable to a coated product, thus eliminating the necessity for a conventional coating process.

In a preferred embodiment of the present invention, the skin layer is formed by adding about 0.1–3.0 wt. % of a glitter pigment with an average particle size of about 5 μm or greater to 100 wt. % of the polypropylene resin containing ethylene by about 6 wt. % or less and the coloring agents. The glitter pigment provides the molded resin with excellent metallic luster and high gloss.

The polypropylene resin of the skin layer has the glitter pigment (average particle size: about 5 μm or greater) added and mixed therewith. The glitter pigment having the above average particle size settles in the softened polypropylene resin at the time of producing the molded resin. The sedimentation of the glitter pigment serves to form a clear layer on the surface of the skin layer, thus increasing depth of gloss and metallic luster. Glitter pigment having an average particle size of less than about 5 μm results in very little sedimentation, and thus no clear layer is formed. As a result, depth of gloss and metallic luster of the resin molding is unsatisfactory.

Figure 3A:
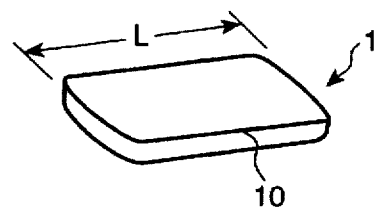
FIG. 3 is a perspective view of a flat type glitter pigment (A) and a bar type glitter pigment (B) of the present invention.
Figure 3B:
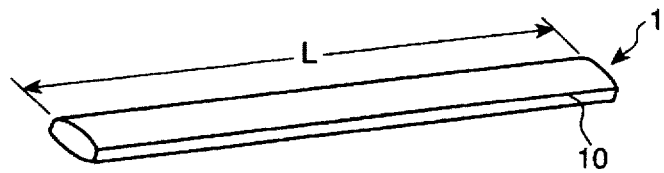

Referring to FIG. 3, the average particle size refers to an average length L of a long piece 10 of a glitter pigment 1. The glitter pigment is mostly plate-like (FIG. 3(A)), bar-like (FIG. 3(B)) or scaly formed. In this invention, its size is defined by the average particle size. Preferably, the glitter pigment also has an average length equal to or less than 500 μm for excellent appearance. An average particle size of the glitter pigment greater than about 500 μm in length is too large to result in an attractive appearance of the molded resin because every particle of the glitter pigment is unnecessarily recognizable. The most preferred range of the particle size of the glitter pigment is about 10 μm to about 100 μm.

The glitter pigment is preferably formed of one or more components of metal powder pigment and/or pearl pigment. Examples of the metal powder pigment include aluminum powder, aluminum flake, aluminum foil, zinc powder, bronze powder and stainless steel powder. Examples of the pearl pigment include transparent pearl mica and interference mica. In addition to the aforementioned glitter pigments, glass flake may be used by itself or mixed with the other components.

The glitter pigment is added to 100 wt. % of the polypropylene resin in an amount of about 0.1–3.0 wt. %. If the glitter pigment content is less than about 0.1 wt. % or exceeds about 3.0 wt. %, sufficient metallic luster and depth of gloss is not obtained.

The skin layer of the molded resin containing the glitter pigment has a clear layer with a thickness of about 25 μm or more on its surface, as a result of the sedimentation of the glitter pigment inwardly dispersed from the outer surface of the skin layer. The clear or transparent layer refers to a layer formed on the outermost surface of the skin layer of the molded resin. The clear layer contains essentially no amount of the glitter pigment. If the thickness of the clear layer is less than about 25 μm, depth of gloss and metallic luster are unsatisfactory.

Figure 2:
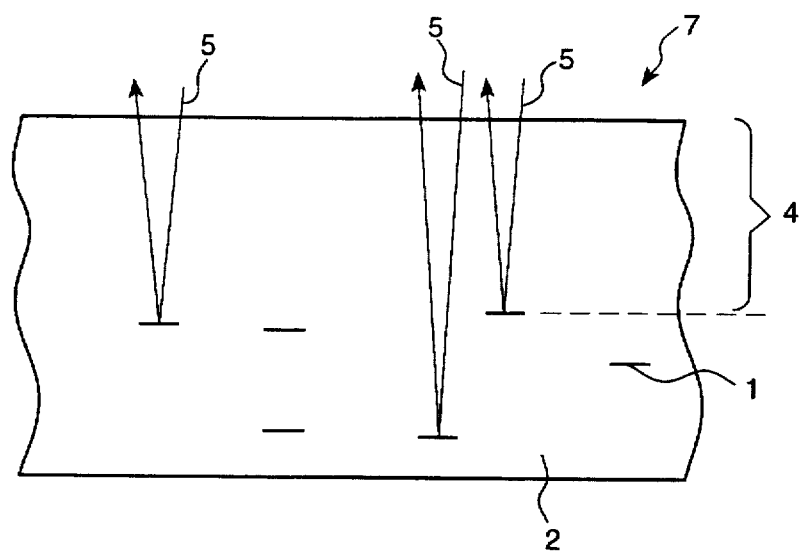
FIG. 2 depicts a skin layer of the molded resin of the present invention with dispersed glitter pigment.

Referring to FIG. 2, since the skin layer contains the glitter pigment, the polypropylene resin 2 forms a matrix within the skin layer of the molded resin 7. The glitter pigment 1 disperses within the polypropylene resin 2. When the polypropylene resin is softened, the glitter pigment 1 settles therein toward the inside of the skin layer of the molded resin 7 from the surface. The skin layer of the molded resin 7 thereby has a clear layer 4 formed on its surface containing essentially no glitter pigment and another layer with the glitter pigment dispersed therein. Light rays 5 pass and penetrate through the clear layer 4 and are reflected by the glitter pigment 1 in the another layer, which allows the molded resin of the present invention to render more depth of gloss, and metallic luster.

In another preferred embodiment of the present invention, the skin layer contains in addition to a polypropylene resin containing ethylene in an amount of about 6 wt. % or less and a coloring agent, one or more of a first light stabilizer as a hindered amine light stabilizer (HALS) having a molecular weight of less than about 1500 and a melting point of about 100° C. or more, and/or a second light stabilizer as a hindered amine light stabilizer having a molecular weight of about 1500 or more.

The aforementioned polypropylene resin used in the skin layer containing the light stabilizer has an ethylene content of about 6 wt. % or less. The ethylene content refers to the content of the rubber such as propylene-ethylene random copolymer contained in the polypropylene resin. If the ethylene content exceeds about 6 wt. %, the molecular motion of contained rubber accelerates diffusion and volatilization of the weather stabilizer in the molded resin, which is likely to cause cracking in the course of outdoor exposure testing over an extended period.

The light stabilizer used is a hindered amine light stabilizer. The hindered amine light stabilizer refers to one having a hindered piperidine skeleton structure in its molecule. The present invention uses the first light stabilizer and/or the second light stabilizer described below.

The first light stabilizer is in the form of the hindered amine light stabilizer having a molecular weight of less than about 1500 and a melting point of about 100° C. or more. If the melting point is less than about 100° C., the light stabilizer is likely to bleed due to deterioration of weather-proofing capability at a high ambient temperature. At the very initial stage of such degradation of weather-proofing, the surface of the molded resin becomes dull, resulting in decreased gloss. The second light stabilizer is in the form of the hindered amine light stabilizer having a molecular weight of about 1500 or more.

Suitable examples of the aforementioned first hindered amine light stabilizer having a molecular weight less than about 1500 and a melting point of about 100° C. or more shown in FIG. 4 include: 1-[2-[3-(3,5-di-t-butyl-4-hydroxyphenyl)propyonyloxy]ethyl]-4-[3-(3,5-di-t-butyl-4-hydroxyphenyl)propyonyloxy]-2,2,6,6-tetramethylpiperidine; and 2-methyl-2-(2,2,6,6-tetramethyl-4-piperidine)amino-N(2,2,6,6-tetramethyl-4-piperidil) propionateamide.

Suitable examples of the second hindered amine light stabilizer having a molecular weight of about 1500 or more shown in FIG. 5 include: polycondensate of succinic acid dimethyl-1-(2 hydroxy ethyl)-4-hydroxy-2,2,6,6-tetramethylpiperidine; poly[{6-(1,1,3,3-tetramethylbutyl)imino-1,3,5-triazine-2,4-diyl}{(2,2,6,6-tetramethyl-4 piperidil)imino} hexamethylene{(2,2,6,6-tetramethyl-4-piperidil)imino}]; and N,N'-bis(3-amino propyl)ethylene diamine-2,4-bis[N-butyl-N-(1,2,2,6,6-penta methyl-4 piperidil)amino]-6-chloro-1,3,5-triazine condensate.

The first or the second light stabilizer or both of the light stabilizers are preferably contained in the skin layer in a total amount of about 0.05–2.0 wt. % to 100 wt. % of polypropylene resin. If the content is less than about 0.05 wt. %, the light stability of the molded resin is decreased, resulting in discoloration. If the content exceeds about 2.0 wt. %, mechanical properties and moldability are deteriorated. Combining each of one or more of the first and the second light stabilizers in the skin layer is preferable to prevent cracking and discoloration In a further embodiment, in addition to the above light stabilizers, it is preferable to include within the skin layer a hindered phenol anti-oxidant, phosphorus heat stabilizer and/or ultraviolet light absorbent so as to provide to the molded resin improved weather-proofing properties at high ambient temperature, processing heat stabilization and heat resistance in a well-balanced manner.

The polypropylene resin of the skin layer contains little rubber content, i.e., about 20 wt. % or less xylene soluble content, which serves to prevent cracking, and provides excellent weather-proofing properties to the molded resin. Since cracking can be prevented, gloss lasts for a long time.

The use in the present invention of a combination of the above high molecular weighted and low molecular weighted hindered amine light stabilizers results in a molded resin which hardly discolors, allowing the use of various coloring agents in a wide range of color options for producing molded resins of various colors.

Therefore, in a preferred embodiment, the high gloss molded resin has: a skin layer on the periphery of the core layer, the skin layer formed of a polypropylene resin containing ethylene in an amount of about 6 wt. % or less, a first light stabilizer formed as a hindered amine light stabilizer with a molecular weight of less than 1500 and a melting point of about 100° C. or higher and/or a second light stabilizer formed as a hindered amine light stabilizer with a molecular weight of 1500 or more, and a coloring agent; and a core layer, the core layer formed of a polypropylene composite material containing one or both of a rubber and an inorganic filler, and having an Izod impact strength (notched) (−30° C.) of about 40 J/m or greater and a flexural modulus ranging from about 300 to about 2500 MPa.

An important feature of the high gloss molded resin is the sandwich construction formed of the outer skin layer comprising the aforementioned composition and exhibiting the physical properties of excellent weather-proofing capability, high gloss, metallic luster and discoloration resistance, and the inner core layer comprising the aforementioned composition and exhibiting the physical property of excellent impact resistance.

The molded resin of the present invention having the above-described skin layer is relatively rigid, so the core layer has to be structured to absorb impact energy. On the one hand, over elasticizing the core layer for absorbing impact unnecessarily increases maximum impact deformation. This may break the skin layer due to notch effects, leading to breakage of the core layer. On the other hand, increasing the rigidity of the core layer excessively, degrades its ability to absorb the impact energy, leading to cracking in the skin layer. Therefore, in order to meet with both requirements of rigidity and impact energy absorption, the core layer should have an Izod impact strength (notched) of about 40 J/m or greater and a flexural modulus of about 300-2500 MPa.

The high gloss molded resin of the present invention is suitable for use as an automobile bumper having an inner core layer according to the foregoing description and an outer skin layer according to the foregoing description.

The automobile bumper according to the present invention exhibits deep and high gloss comparable to a conventional coated product. Especially, when using the glitter pigment to enhance luster and gloss, a clear layer is formed on the outermost surface of the skin layer of the bumper with the glitter pigment disposed therein, thus providing excellent metallic luster comparable to that of a conventional metal coated product.

Since the skin layer of the bumper is formed of the above-described polypropylene resin having high rigidity, the surface is not easily scratched. Therefore, the bumper of the present invention does not require conventional coating processes, as its surface has high gloss, metallic luster and scratch resistance comparable to a coated product.

Similarly, the core layer of the automobile bumper according to the present invention is formed of the above-described polypropylene composite material having a specific composition and physical properties such as Izod impact strength (notched) and flexural modulus, so as to render the bumper impact resistant, and so the skin layer can be formed in conformity with the requirements of high gloss and scratch resistance without considering the requirement of strength.

As aforementioned, the molded resin of the present invention provides a bumper having excellent impact resistance, high gloss, metallic luster and scratch resistance as excellent as that of a conventional coated product, thus eliminating the coating process.

The molded resin of the present invention is further illustrated in the following Examples, without limitation or restriction thereto. It is further understood that the inventors contemplate variations on the parameters and components of the core and skin layers of the molded resin described above, and uses thereof, within the scope of the present invention and that described in the related Japanese applications 292048 (Oct. 31, 1994), 68792 (Mar. 1, 1995), 68794 (Mar. 1, 1995) and 68795 (Mar. 1, 1995), the disclosures of which are all hereby incorporated by reference.

EXAMPLES

Example 1

The examples described below illustrate the high gloss molded resin according to the present invention in relation to comparative examples of molded resins.

In this example, test samples were subjected to evaluative testing on gloss, appearance, scratch resistance and low temperature impact resistance.

The test samples were formed as a flat plate (width: 60 mm, length: 120 mm, thickness: 3 mm) processed through a sandwich injection molding machine. Some of the comparative samples were formed to have a single layer instead of a sandwich construction composed of a core layer and a skin layer.

Table 1 shows each composition and the properties of the materials used in this example. The samples 1-7 (indicated as Examples 1-7 in Table 5) and the comparative samples C1-C9 (indicated as Comparative Examples C1-C9 in Table 5) employed the core- and skin-layer forming materials selected among those listed in Table 1 and Table 2. As for the comparative samples formed of a single layer, only one material was selected. The skin layer had a coloring agent (described later) contained therein. The crystalline polypropylene resins were selected for the Examples from those disclosed and with parameters within the scope of invention previously described, in order to illustrate requirements of a well-balanced molded resin.

As Table 1 shows, in this example, 5 types of crystalline polypropylene resins were prepared (hereinafter referred to as PP). As Table 2 shows, in this example, 2 types of rubber modified PP were also prepared, each containing amounts of amorphous ethylene propylene rubber and talc. The PPG in Table 2 was prepared by mixing glass fiber with the PP.

Table 3 shows the respective ethylene content and MFR (Melt Flow Rate) of the PPs (PP-6–PP-8) containing either the rubber modified PP-1 or PP-2, or the PPG. As can be seen from Table 1, as the ethylene content increased, the xylene soluble content of the PP-1 to PP-5 also increased. As the ethylene content decreased, the xylene soluble content also decreased.

The coloring agent used consisted of the two types of pigments having components and compounding wt. % ratios listed in Table 4. The pigment M refers to dark metallic blue. The pigment S refers to dark blue.

Table 5 shows the testing results of each core- and skin-forming material used for the Examples 1-7 and Comparative Examples C1-C9.

In Table 5, each material is expressed as the sample No. (Table 1, Table 2)—the pigment code (Table 4). For example, the skin layer of Example 1 used the sample no. PP-1 and the pigment M, thus being expressed as "PP-1-M".

Table 1 shows measurement results of Rockwell hardness and MFR (Melt Flow Rate) as the physical property of the respective PPs. The Rockwell hardness was measured with R scale in accordance with JIS-K7207. The MFR was measured at 230° C. under a load of 2160 g in accordance with JIS-K6758.

TABLE 1

| | (PP) | | | |
|---|---|---|---|---|
| Sample No. | Ethylene content (wt. %) | Rockwell hardness | MFR (g/10 min.) | Xylene soluble content (wt. %) |
| PP-1 | 0 | 113 | 45 | 0 |
| PP-2 | 0 | 105 | 40 | 0 |
| PP-3 | 4.3 | 95 | 50 | 11 |
| PP-4 | 7.3 | 80 | 45 | 15 |
| PP-5 | 10.3 | 96 | 40 | 17 |

TABLE 2

(Rubber modified PP or PPG)

[unit:wt. %]

| | Sample No. | | |
|---|---|---|---|
| Composition | Rubber modified PP-1 | Rubber modified PP-2 | PPG |
| PP-6 (Table 3) | 60 | | |
| PP-7 (Table 3) | | 45 | |
| PP-8 (Table 3) | | | 75 |
| Amorphous etylene propylene rubber ‡A | 30 | 45 | |
| talc ‡B | 10 | 10 | |
| Maleic anhydride modified PP | | | 5 |
| Glass fiber ‡C | | | 20 |

‡A: Mooney viscosity $ML_{1+4}(100°$ C.$) = 15$ propylene content: 24 wt. %
‡B: Average particle size: 2 μm
‡C: chopped strand (length: 3 mm, ø:13 mm)

TABLE 3

| Sample No. | Etylene content (wt. %) | MFR (g/10 min.) |
|---|---|---|
| PP-6 | 4.3 | 30 |
| PP-7 | 4.4 | 60 |
| PP-8 | 7.0 | 30 |

TABLE 4

[unit: wt. %]

| | Code | |
|---|---|---|
| Pigment | M | S |
| Carbon black | 0.2 | 0.2 |
| Phthalocyanine blue | 0.3 | 0.3 |
| Benzidine yellow | 0.1 | 0.1 |
| Titanium oxide | 0.2 | 0.2 |
| Magnesium stearate | 0.5 | 0.5 |
| Aluminum powder | 1.0 | — |

M: Metallic dark blue
S: Dark blue

Each evaluation result is described referring to Table 5. The gloss or glassiness measurement result is first described.

The gloss was evaluated in accordance with JIS-Z8741 by measuring the mirror surface gloss value at 60° C. to the gloss measuring device. A gloss value exceeding 70% was set as a target value representing excellent gloss comparable to a conventional coated product.

As Table 5 shows, test samples 1–7, C5 and C6 using PP-1, PP-2 and PP-3 as the skin layer or single layer showed high gloss exceeding 70%. The gloss value shows a tendency to become greater if the crystallization degree is greater, i.e., greater Rockwell hardness.

Evaluated results for appearance are described. The appearance was evaluated through visual observation of the molded test samples. The evaluated samples were classed into 3 grades, with the first grade representing appearance quality of the sample equivalent to or better than a coated product, the second grade representing appearance quality of the sample inferior to that of a coated product, and the third grade representing appearance quality of the sample far inferior to that of a coated product. Each sample is expected to be first or second graded.

As Table 5 shows, samples 1–7, C5 and C6 using high crystallized PP-1, PP-2 and PP-3 as the skin layer or single layer measured good appearance quality values as being second or first graded. Especially, the samples 1–2, 4–7 and C5 using the high crystallized PP-1 and PP-2 resulted in excellent appearance quality (grade 1) equivalent to or better than a coated product.

The measurement results of scratch resistance testing are next described. The scratch resistance was measured in accordance with JIS-K5401 with a surface testing machine manufactured by Shinto Kagaku Co., Ltd. More specifically, an iron pin with a diameter of 2 mm φ was set at 45° to the test sample. Then a 100 g load was applied to the iron pin to scratch the sample surface at a constant speed of 150 mm/s. The resultant scratch resistance was evaluated and graded as described below.

A sample with no scratching was first graded. A sample with little scratching was second graded. A sample with some scratching was third graded. A test sample with significant scratching was fourth graded. The sample is required to be second or first graded. As shown in Table 5, samples 1–7 and C4–C6 using high crystallized PP-1, PP-2 and PP-3 and PPG as the skin layer or the single layer measured excellent scratch resistance as being second or first graded. Especially the samples 1–2, 4–7 and C5 using high crystallized PP-1 and PP-2 were hardly scratched, resulting in excellent (grade 1) scratch resistance.

The test results of low temperature impact resistance are described.

In the testing, each sample was kept at an ambient temperature of −30° C. for 3 hours. Then a steel ball (diameter: 50 mm φ, weight: 1 kg) was dropped on the sample. The drop height causing cracking in the sample was measured and evaluated.

The test samples C1–C7 listed in Table 5 show great difference in the impact resistance at low temperature between the rubber modified PP and high crystallized PP. The samples C1–C3 using the modified rubber PP had no crack even when the steel ball was dropped from 150 cm or higher, resulting in excellent low temperature impact resistance. The samples C5–C7 using only PP as a single layer resulted in rather lower impact resistance compared to those using the modified rubber PP. The impact resistance of the sample C4 using PPG measured the middling value between values of those using the modified PP and PP, as the single layer.

The two-layered test samples (1–7, C8 and C9 in Table 5) presented characteristics of the core-forming material. The samples 1–4, 6, C8 and C9 using the rubber modified PP for the core layer measured excellent low temperature impact resistance compared to that of samples 5 and 7 using the PPG as the core layer.

In summary, the samples using PP-1, PP-2 and PP-3 for either the single or the skin layer showed excellent external appearance quality represented by the gloss and appearance test results. The samples using modified rubber PP and PPG resulted in inferior appearance quality to that of a coated product.

The samples using the PP for the single layer resulted in good appearance quality. However, it fails to meet the requirement of the exterior trim part of an automobile because of inferior low temperature impact resistance.

TABLE 5

| Specimen | Material skin layer | Material core layer (Comparative Examples 1-7: single layer) | Test results Glossiness (%) | Appearance | Scratch resistance | Low temperature impact resistance (cm) |
|---|---|---|---|---|---|---|
| Comparative examples | | | | | | |
| C1 | Rubber modified PP-1-M | | 49 | 3 | 4 | >150 |
| C2 | Rubber modified PP-1-S | | 46 | 3 | 4 | >150 |
| C3 | Rubber modified PP-2-M | | 44 | 3 | 4 | >150 |
| C4 | PPG-M | | 31 | 3 | 2 | 120 |
| C5 | PP-1-M | | 82 | 1 | 1 | 60 |
| C6 | PP-3-M | | 74 | 2 | 2 | 70 |
| C7 | PP-5-M | | 60 | 3 | 3 | 130 |
| Examples | | | | | | |
| 1 | PP-1-M | Rubber modified PP-1 | 82 | 1 | 1 | >150 |
| 2 | PP-2-M | ↑ | 80 | 1 | 1 | >150 |
| 3 | PP-3-M | ↑ | 74 | 2 | 2 | >150 |
| Comparative examples | | | | | | |
| C8 | PP-4-M | ↑ | 57 | 3 | 4 | >150 |
| C9 | PP-5-M | ↑ | 60 | 3 | 3 | >150 |
| Examples | | | | | | |
| 4 | PP-1-M | Rubber modified PP-2 | 82 | 1 | 1 | >150 |
| 5 | PP-1-M | PPG | 82 | 1 | 1 | 110 |
| 6 | PP-1-S | Rubber modified PP-1 | 79 | 1 | 1 | >150 |
| 7 | PP-1-S | PPG | 79 | 1 | 1 | 120 |

Example 2

The high gloss molded resin of this example is in the form of a side molding 310 for an automobile, as depicted in FIG. 1, which is composed of a core layer 32 and a skin layer 33. The core layer 32 is formed of a polypropylene composite material according to the present invention and the skin layer 33 is formed of a mixture of polypropylene resin and coloring agent according to the present invention.

The polypropylene resin for the skin layer 33 contained no ethylene which was the same as the sample 1 of Example 1, having a Rockwell hardness of 113. The coloring agent for the skin layer used the pigment M employed in the samples 1-5 (Table 4) of Example 1. The polypropylene composite material for the core layer 32 used high crystallized polypropylene resin containing amorphous ethylene propylene rubber by 30 wt. % and talc by 10 wt. %, which was the same as the sample of rubber modified PP-1 (Table 2) of Example 1.

A side molding 310 of this example was prepared by using the above described materials molded through a sandwich injection molding machine.

The side molding 310 of this example exhibited high gloss, metallic luster and scratch resistance as excellent as that of a coated product, and the same as the molded resin of sample 1 of Example 1. It also exhibited excellent low temperature impact resistance, thus sufficiently meeting the requirement for the side molding of an automobile.

Besides the side molding, the high gloss molded resin obtained from this invention may be applied to exterior trim parts including a wheel cover, side garnish, locker panel, bumper, bumper corner, spoiler, and center pillar; interior trim parts including a meter cluster, center cluster and garnish; and other parts requiring high gloss such as transporting devices, and electric appliances for various industrial usages. In addition to sandwich injection molding, the molded resin of the present invention may be manufactured through two layer extrusion molding, two layer blow molding, and the like.

Example 3

This example is in the form of a high gloss molded resin according to the present invention with the skin layer containing a glitter pigment. The color depth and metallic luster of the high gloss resin molding were evaluated.

The testing used samples of a molded resin composition in which a glitter pigment and coloring agent were added to the polypropylene resin. Tables 6-8 show each resin composition for samples E11-E18 and C11-C13. As those tables show, this example used 3 types of polypropylene resins, PP-11-PP-13. Each ethylene content, xylene soluble content, Rockwell hardness and melt flow rate of the PP-11-PP-13 are also shown in Tables 6-8.

The example used 6 types of glitter pigments, M-1-M-6 contained in the polypropylene resin by wt. % as shown in Tables 6-8. Among those glitter pigments, M-1, M-2, M-3, M-4 and M-5 were aluminum powders with average particle sizes of 21 µm, 14 µm, 3 µm, 11 µm and 110 µm, respectively. The glitter pigment M-6 was pearl mica with an average particle size of 9 µm.

As Tables 6–8 show, the coloring agent was added and mixed to the polypropylene resin in an amount of 1.3 wt. % in total. The coloring agent was composed of 0.2 wt. % of carbon black, 0.3 wt. % of phthalocyanine blue, 0.1 wt. % of benzidine yellow, 0.2 wt. % of titanium oxide and 0.5 wt. % of magnesium stearate, to 100 wt. % of the polypropylene resin, resulting in a total content of 1.3 wt. %.

The test samples were prepared by forming the above-composed material through injection molding into a flat plate (150 mm×150 mm) with a thickness of 3 mm.

The color depth and metallic luster of the test samples were measured by the following method.

[Color depth]

A microscope which allows one to observe the vertical amount of movement of its stage was selected. The test sample surface was focused and the stand position at this time was designated as point A. Then, deposited glitter pigment was focused by adjusting the stand up and down. The stand position at the point at which the glitter pigment was focused was designated as point B. An absolute value between points A and B was obtained and designated as a moving amount of the stand ΔX which represented the deposition or sedimentation depth of the glitter pigment. This value ΔX was used as a depth index of the test sample.

[Metallic luster]

The samples were observed with the naked eye and graded as follows.

Grade 1: Metallic luster equivalent to or better than a coated product.

Grade 2: Metallic luster slightly inferior to a coated product.

Grade 3: No metallic luster

The Tables 6–8 show the above measurement results of samples E11–E18 and comparative samples C11–C13, respectively.

As shown in the tables, samples E11–E18 measured a sedimentation depth ranging from 31 to 44 μm, and exhibited sufficient metallic luster represented by Grade 1 or 2.

As shown in Table 6, samples E11, E12, E13 and C11 used the specific M-1 glitter pigment by different composition ratio to a predetermined amount of the PP-11 polypropylene resin. The sample C11 containing the glitter pigment by 4 wt. % measured low sedimentation depth and low metallic luster. This shows that the glitter pigment is preferably added by about 3 wt. % or less to 100 wt. % of the polypropylene.

As shown in Table 7, the samples E14, E15, E16, E17 and C12 used different types of glitter pigments. The above samples showed the tendency to increase in sedimentation depth and metallic luster when using the aluminum powder or pearl mica with average particle size of 5 μm or more. The sample C12 using the aluminum powder with an average particle size of 3 μm resulted in low deposition depth and insufficient metallic luster.

This shows that it is preferable to use aluminum powder or pearl mica with an average particle size of about 5 μm or more as the glitter pigment.

As shown in Table 8, the samples E18 and C13 used the same type of glitter pigment with the same composition ratio but different ethylene content of the polypropylene. Increasing the ethylene content showed the tendency to decrease the sedimentation depth of the glitter pigment and to deteriorate the metallic luster. Especially the sample C13 containing ethylene by 12.0 wt. % exhibited no metallic luster. This shows that it is preferable to use polypropylene resin containing ethylene by about 6 wt. % or less.

The measurement results show that a high gloss molded resin is produced by adding a glitter pigment with an average particle size of about 5 μm or more in an amount of about 0.1–3 wt. % to 100 wt. % of polypropylene resin containing ethylene by about 6 wt. % or less so that the resultant resin molding has a desired sedimentation depth and excellent metallic luster.

TABLE 6

| composition | Examples [unit: wt. %] | | | |
| --- | --- | --- | --- | --- |
| | E 11 | E 12 | E 13 | C 11 |
| Polypropylene | | | | |
| PP-11 (E*:0, X*:0, R*:113, M*:45) | 100 | 100 | 100 | 100 |
| PP-12 (E*:4.0, X*:8.4, R*:98, M*:60) | | | | |
| PP-13 (E*:12.0, X*:22.0, R*:70, M*:12) | | | | |
| Glitter Pigment | | | | |
| M-1 (Aluminum powder 21 μm) | 0.5 | 1.0 | 2.5 | 4.0 |
| M-2 (Aluminum powder 14 μm) | | | | |
| M-3 (Aluminum powder 3 μm) | | | | |
| M-4 (Aluminum powder 11 μm) | | | | |
| M-5 (Aluminum powder 110 μm) | | | | |
| M-6 (Pearl mica 19 μm) | | | | |
| Total amount of coloring agents | 1.3 | 1.3 | 1.3 | 1.3 |
| Sedimentation depth (μm) | 44 | 43 | 38 | 17 |
| Metallic luster | 1 | 1 | 2 | 3 |

E*: Ethylene content (unit: wt. %)
X*: Xylene soluble content (unit: wt. %)
R*: Rockwell hardness (R scale)
M*: Melt flow rate (MFR)

TABLE 7

| composition | Examples [unit: wt. %] | | | | |
| --- | --- | --- | --- | --- | --- |
| | E 14 | C 12 | E 15 | E 16 | E 17 |
| Polypropylene | | | | | |
| PP-11 (E*:0, X*:0, R*:113, M*:45) | 100 | 100 | 100 | 100 | 100 |
| PP-12 (E*:4.0, X*:8.4, R*:98, M*:60) | | | | | |
| PP-13 (E*:12.0, X*:22.0, R*:70, M*:12) | | | | | |
| Glitter Pigment | | | | | |
| M-1 (Aluminum powder 21 μm) | | | | | |
| M-2 (Aluminum powder 14 μm) | 1.0 | | | | |
| M-3 (Aluminum powder 3 μm) | | 0.5 | | | |
| M-4 (Aluminum powder 11 μm) | | | 1.0 | | |
| M-5 (Aluminum powder 110 μm) | | | | 1.0 | |
| M-6 (Pearl mica 19 μm) | | | | | 1.0 |
| Total amount of coloring agents | 1.3 | 1.3 | 1.3 | 1.3 | 1.3 |
| Sedimentation depth (μm) | 41 | 8 | 39 | 34 | 31 |
| Metallic luster | 1 | 3 | 1 | 2 | 1 |

E*: Ethylene content (unit: wt. %)
X*: Xylene soluble content (unit: wt. %)
R*: Rockwell hardness (R scale)
M*: Melt flow rate (MFR)

TABLE 8

[unit : wt %]

| composition | Examples | |
|---|---|---|
| | E 18 | C 13 |
| Polypropylene | | |
| PP-11 (E*:0, X*:0, R*:113, M*:45) | | |
| PP-12 (E*:4.0, X*:8.4, R*:98, M*:60) | 100 | |
| PP-13 (E*:12.0, X*:22.0, R*:70, M*:12) | | 100 |
| Glitter Pigment | | |
| M-1 (Aluminum powder 21 μm) | 1.0 | 1.0 |
| M-2 (Aluminum powder 14 μm) | | |
| M-3 (Aluminum powder 3 μm) | | |
| M-4 (Aluminum powder 11 μm) | | |
| M-5 (Aluminum powder 110 μm) | | |
| M-6 (Pearl mica 19 μm) | | |
| Total amount of coloring agents | 1.3 | 1.3 |
| Sedimentation depth (μm) | 44 | 20 |
| Metallic luster | 1 | 3 |

E*: Etylene content (unit: wt. %)
X*: Xylene soluble content (unit: wt. %)
R*: Rockwell hardness (R scale)
M*: Melt flow rate (MFR)

Example 4

This example illustrates a molded resin of the present invention presenting high gloss, and excellent weather-proofing and discoloration-proofing properties. The weather-proofing and discoloration-proofing properties of the above molded resin were measured. The measurement used the resin compositions listed in Table 11, employing 5 types of polypropylene resins, PP-21–PP-24 and the rubber modified PP-20.

As Table 9 shows, each polypropylene resin PP-21, PP-22, PP-23 and PP-24 had a different ethylene content. The rubber modified PP-20 contained a mixture of 30 wt. % of ethylene propylene rubber (EPR) and 10 wt. % of talc to 60 wt. % of the PP-23 composition. This table also shows each melt flow rate (MFR) and xylene soluble content amount of each of the resins as well as the Rockwell hardness (R scale) thereof. The MFR was measured at 230° C. under a load of 2160 g in accordance with JIS-6758.

Figure 6:
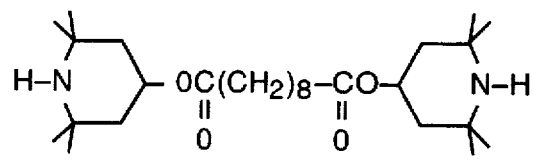
FIG. 6 depicts the chemical formula of the hindered amine light stabilizer (HALS-2) as in Example 4.

The light stabilizer used three types of HALS (hindered amine light stabilizer) 1, 2 and 3. The HALS-1 was 2-methyl-2-(2,2,6,6-tetramethyl-4-piperidil)amino-N-(2,2,6,6-tetramethyl-4-piperidil)propionateamide as shown in the chemical formula of FIG. 4. The HALS-2 was bis(2,2,6,6-tetramethyl-4-piperidil) sebacate as shown in the chemical formula of FIG. 6. The HALS-3 was poly[[6-(1,1,3,3-tetramethyl butyl)imino-1,3,5-triazine-2,4-diyl][(2,2,6,6-tetramethyl-4-piperidil)imino] hexamethylene [(2,2,6,6-tetramethyl-4-piperidil)imino]] as shown in the chemical formula of FIG. 5. Table 10 shows the respective molecular weights and melting points of those light stabilizers. The HALS-3 has its softening point at 120° C., however, it has no specific melting point. The coloring agents listed in Table 12 were employed.

Figure 7:
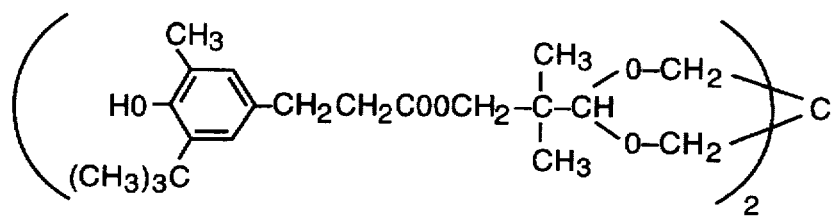
FIG. 7 depicts the chemical formula of a hindered phenol anti-oxidant of the present invention.
Figure 8:
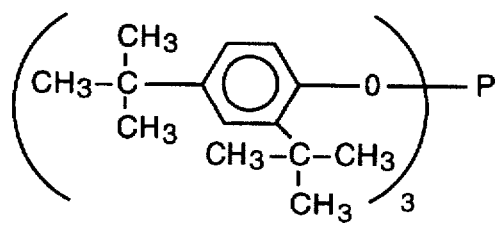
FIG. 8 depicts the chemical formula of a phosphorus thermal stabilizer of the present invention.
Figure 9:
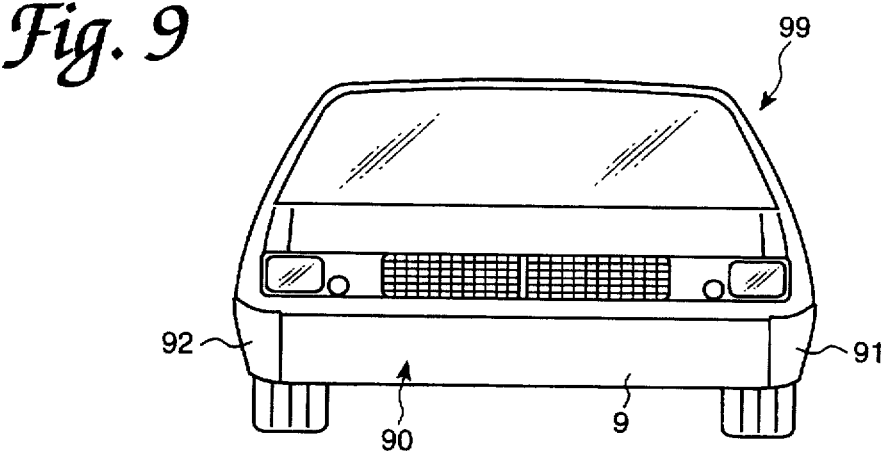
FIG. 9 is a front view of an automobile with a mounted bumper as in Example 6.
Figure 10:
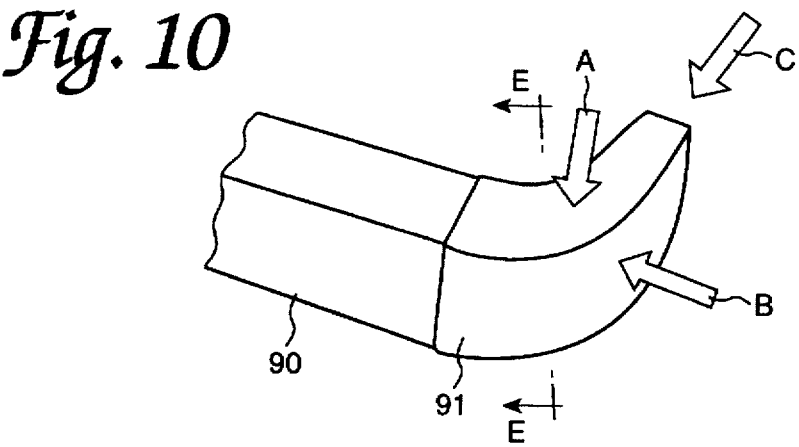
FIG. 10 is a perspective view of an automobile with a corner bumper as in Example 6.
Figure 11:
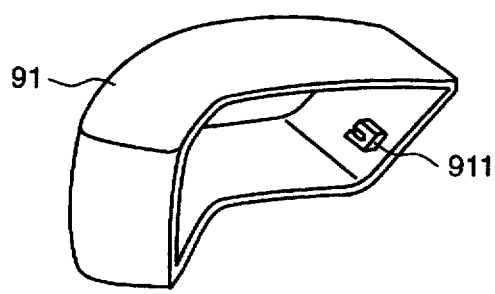
FIG. 11 is a perspective view depicting the interior surface of the corner bumper of Example 6.

The above resin compositions included a mixture of 0.2 wt. % of hindered phenol antioxidant and 0.1 wt. % of phosphorus heat stabilizer to 100 wt. % of the resin composition, besides the components listed in Table 11. FIGS. 7 and 8 show the chemical formula of the hindered phenol antioxidant and the phosphorus heat stabilizer, respectively.

The above resin compositions were prepared by kneading in a biaxial extruding machine into pellets and then formed into test samples (40 mm×100 mm) with a thickness of 2 mm processed through an injection molding machine.

In this example, the weather-proofing and discoloration-proofing (dullness on the sample surface at initial degradation stage) properties of each test sample were measured as described below.

[Weather-proofing property]

The test sample was exposed at a black panel temperature of 83° C. by using a Sunshine Weather-O-Meter (SWOM). During the test period, cracking occurring on the test sample surface was observed with a loupe or magnifying glass (magnification ×30).

[Discoloration-proofing property]

The test sample was exposed in the environment at 83° C. for 250 hours with the SWOM. After the testing, the color difference change value ΔE* was measured in accordance with JISZ8730.

Table 11 shows the above test results. E21–E25 refer to samples prepared in this example according to the present invention, and C21–C23 refer to comparative samples.

The measurement results shown in Table 11 are hereinafter described. As the table shows, the samples E21–E25 took more than 3200 hours to develop cracking and resulted in a low color difference change value ΔE* of 1.0 or less. The comparative samples C21–C23 resulted in a high color difference change value ΔE* of 1.2 or more. The molded resin according to the samples E21–E25 provided high weather-proofing and discoloration proofing properties. As the ethylene content in the polypropylene resins was increased, the samples E21, E22, E23 and C21 showed the tendency to have shorter crack periods and greater color difference change value ΔE*. When using the rubber modified PP-20, the comparative sample C22 showed a crack period of 1500 hours and color difference change value ΔE* of 1.6.

The above results show that a polypropylene resin having an ethylene content of 6 wt. % or less is able to resist cracking for a longer period, thus improving its weather-proofing property for keeping beautiful gloss for an extended period.

In the case of adding the hindered amine light stabilizer (HALS-2), with its molecular weight of 480 and melting point at 83° C., to sample C23, dullness on the surface was observed at the initial weather degradation stage and a remarkably high color difference change value ΔE* was measured. This shows that using one or both of the hindered amine light stabilizers with a molecular weight of less than 1500 and melting point at 100° C. or more and a light stabilizer with a molecular weight more than 1500 will provide high discoloration-proofing capability.

TABLE 9

| Sample No. | Component | Etylene content (wt. %) | Xylene soluble content (wt. %) | MFR (g/10 min.) | Rockwell hardness (R scale) |
|---|---|---|---|---|---|
| PP-21 | Homopolypropylene resin | 0 | 0 | 45 | 113 |
| PP-22 | Random polypropylene resin | 1.5 | 3 | 40 | 90 |
| PP-23 | Block polypropylene resin | 4.3 | 11 | 50 | 98 |
| PP-24 | Block polypropylene resin | 12.0 | 22 | 12 | 70 |
| Rubber modified PP-20 | PP-23/EPR/talc = 60/30/10 | — | 41 | 15 | 35 |

TABLE 10

| Sample No. | Molecular weigt | Melting point (°C.) |
|---|---|---|
| HALS-1 | 380 | 125 |
| HALS-2 | 480 | 83 |
| HALS-3 | 2000–3300 | — |

TABLE 11

[unit: wt. %]

| | Sample No. | | | | | | | |
|---|---|---|---|---|---|---|---|---|
| | E21 | E22 | E23 | E24 | E25 | C21 | C22 | C23 |
| Polypropylene | | | | | | | | |
| PP-21 | 100 | | | 100 | 100 | | | 100 |
| PP-22 | | 100 | | | | | | |
| PP-23 | | | 100 | | | | | |
| PP-24 | | | | | 100 | | | |
| Rubber modified PP-20 | | | | | | 100 | | |
| Light stabilizer | | | | | | | | |
| HALS-1 | 0.2 | 0.2 | 0.2 | 0.4 | | 0.2 | 0.2 | |
| HALS-2 | | | | | | | | 0.2 |
| HALS-3 | 0.2 | 0.2 | 0.2 | | 0.4 | 0.2 | 0.2 | 0.2 |
| Coloring agent (Total amount) | 2.3 | 2.3 | 2.3 | 2.3 | 2.3 | 2.3 | 2.3 | 2.3 |
| Crack period (Hr.) | 4300 | 4100 | 3600 | 3200 | 3400 | 2200 | 1500 | 3800 |
| Color difference ΔE* | 0.8 | 0.7 | 1.0 | 0.8 | 0.6 | 1.2 | 1.6 | 7.5 |

TABLE 12

(Coloring agent)

| Pigment | Compound rate (wt. %) |
|---|---|
| Carbon black | 0.2 |
| Phthalocyanine blue | 0.3 |
| Benzidine yellow | 0.1 |
| Magnesium stearate | 0.5 |
| Aluminum powder | 1.0 |
| Total weight | 2.3 |

Example 5

A molded resin of this example according to the present invention is described. In this example, the molded resin is formed as a bumper for an automobile. Its weather-proofing and discoloration proofing properties and low temperature impact resistance were evaluated.

Evaluation of characteristics of the bumper were made especially to the corner bumper (see FIGS. 9–12) because it is required to have high gloss and high scratch resistance like the side body of an automobile, and is also required to have the highest impact resistance than those of other portions of the bumper. The corner bumper was composed of a skin layer and a core layer processed through a sandwich injection molding machine (see FIG. 12).

A method for manufacturing the corner bumper is described. The skin-forming and the core-forming materials were individually prepared. The skin-forming material used the same resin composition as the sample E21 of Example 4 (see Table 11). The core-forming polypropylene resin (PP) composite material was composed of 40 wt. % of PP, 50 wt. % of EPR and 10 wt. % of talc (see sample G-1, Table 13). Its Izod impact strength at −30° C. measured 190 J/m and flexural modulus measured 450 MPa. The EPR had Mooney viscosity $ML_{1+4}$ at 100° C. of 15 and contained 24 wt. % of propylene. The talc had an average particle size of 2 μm.

Then, the corner bumper was prepared by using the aforementioned skin-forming PP materials and the core-forming PP composite materials through a sandwich molding method. An example of a suitable sandwich molding method is described in U.S. Pat. No. 4,715,802 to Arai, the disclosure of which is hereby incorporated by reference.

Another corner bumper was also prepared as a comparative sample by using only the skin-forming material of the sample E21 of Example 4.

Both corner bumpers were subjected to testing of weather-proofing and discoloration-proofing properties in the same manner as aforementioned. The test for low temperature impact resistance was executed by keeping the above-prepared corner bumpers at an ambient temperature of −30° C. for 3 hours and then dropping a steel ball (diameter:50 mm φ, weight:1 kg) thereon to measure the height necessary to cause breakage or cracking of the bumper, which was evaluated as low temperature impact strength (N-m).

The sample corner bumper composed of the skin-forming PP material and the core-forming PP composite material measured the larger crack period of 4300 hours and low color difference change value ΔE* of 0.8. The low temperature impact strength measured more than 9.8 N-m.

The comparative sample corner bumper composed of only the skin-forming material as the sample E21 in Example 4 measured the same crack period and color difference change value ΔE* as that of the above bumper. However, its impact strength at low temperature measured a low value of 2.0 N-m.

As a result, according to the present invention, the above-composed skin layer provides high weather-proofing property, high gloss and high discoloration-proofing property. The core layer formed of the above-described PP composite material further provides greater impact resistance.

Example 6

In this example, a bumper for an automobile according to the present invention was prepared and tested for gloss, appearance, scratch resistance and low temperature impact resistance.

The bumper was fabricated with a sandwich injection molding machine.

As FIGS. 9–12 show, the bumper is expected to be fixed to the front and rear parts of an automobile 99. The bumper 9 is composed of a nearly straight body bumper 90 and right and left corner bumpers 91 and 92. These bumpers are formed into one body with an adhesive agent so as to be fixed to the automobile. In this example, the corner bumper 91 was tested.

Figure 12:
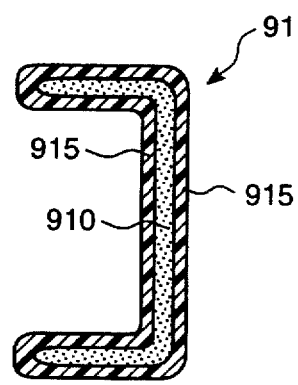
FIG. 12 is a cross-sectional view of the corner bumper taken on line E—E of FIG. 10.

Referring to FIG. 12, the corner bumper 91 was composed of a core layer 910 and a skin layer 915 applied thereon through a sandwich injection molding method. Reference numeral 911 in FIG. 11 denotes a clip used for fixing the bumper to the automobile.

In this example, characteristics of the bumper were evaluated especially with respect to the corner bumper 91, since it is required to have a gloss and scratch resistance as high as those of the side body of the automobile and the highest impact resistance.

The evaluation was executed by preparing the core-forming material and the skin-forming material individually.

The core-forming polypropylene resin composite materials used had the composition, Izod impact strength (J/m) at −30° C., and flexural modulus (MPa), represented by samples G-1 to G-8 listed in Table 13. In the samples G-1 to G-7, the polypropylene resin (PP) in the core layer is block polypropylene having a melt flow rate of 30 and an ethylene content of 7 wt. %, and the EPR in the core layer is noted "*A" in Table 13. The sample G-8 shown in Table 13 was formed of only TPO (Olefin thermoplastic elastomer) containing no talc.

The skin-forming PP composition samples S-1 to S-5 used materials having ethylene contents and physical properties listed in Table 14.

The skin-forming PP samples were measured for physical properties of Rockwell hardness and MFR (Melt Flow Rate). The measurement results are shown in Table 14. The Rockwell hardness was measured with R scale in accordance with JIS-K7207. The MFR was measured at 230° C. under a load of 2160 g in accordance with JIS-K6758.

The coloring agent used pigments having components and amounts (weight distribution ratio to 100 wt. % of the skin-forming material) listed in Table 15.

The amount of the skin-forming PP material (Table 14) was adjusted by adding and mixing each of the coloring agents (Table 15) thereto, from which the corner bumper shown in FIGS. 9–12 was fabricated for testing and evaluation.

Table 16 shows the evaluation results with respect to gloss (%), appearance and scratch resistance of the tested corner bumpers (T-1–T6) formed by using the respective skin-forming materials.

TABLE 13

(Core-forming PP composite material)

| Sample No. | PP | EPR *A | Modified PP(maleic anhydride modified) | talc *B | Glass fiber *C | Izod impact strength (−30° C.) (J/m) | Flexural modulus (MPa) |
|---|---|---|---|---|---|---|---|
| G-1 | 40 | 50 | | 10 | | 190 | 450 |
| G-2 | 60 | 40 | | | | 110 | 800 |
| G-3 | 60 | 30 | | 10 | | 65 | 1200 |
| G-4 | 45 | 25 | | 30 | | 45 | 2200 |
| G-5 | 100 | | | | | 30 | 1100 |
| G-6 | 70 | | | 30 | | 25 | 3300 |
| G-7 | 65 | | 5 | | 30 | 75 | 4800 |
| G-8 | Orefin series thermoelastic elastomer(TPO) | | | | | >500 (N · B) | 100 |

*A: Mooney viscosity $ML_{1+4}$(100° C.) = 15 Propylene content: 24 wt. %
*B: Average particle: 2 μm
*C: Chopped strand (length: 3 mm, φ 13 mm)
NB: No breakage

TABLE 14

(Skin-forming PP)

| Sample No. | Ethylene content (wt. %) | Rockwell hardness | MFR (g/10 min.) | Xylene soluble content (wt. %) |
|---|---|---|---|---|
| S-1 | 0 | 113 | 45 | 0 |
| S-2 | 0 | 105 | 40 | 0 |
| S-3 | 4.3 | 95 | 50 | 11 |
| S-4 | 7.3 | 80 | 45 | 15 |
| S-5 | 10.3 | 96 | 40 | 17 |

TABNLE 15

(Coloring agent)

| Pigment | Compound rate (wt. %) |
|---|---|
| Carbon black | 0.2 |
| Phthalocyanine blue | 0.3 |
| Benzidine yellow | 0.1 |
| Magnesium stearate | 0.5 |
| Aluminum powder | 1.0 |

TABLE 16

(Evaluation external appearance quality)

| Sample No. | Skin-forming material | Gloss Value (%) | appearance | scratch resistance |
|---|---|---|---|---|
| Examples | | | | |
| T-1 | S-1 + Coloring agent | 82 | 1 | 1 |
| T-2 | S-2 + Coloring agent | 80 | 1 | 1 |
| T-3 | S-3 + Coloring agent | 74 | 2 | 2 |
| Comparative examples | | | | |
| T-4 | S-4 + Coloring agent | 57 | 3 | 4 |
| T-5 | S-5 + Coloring agent | 60 | 3 | 3 |
| T-6 | G-3 + Coloring agent | 49 | 3 | 4 |

Referring to Table 16, each evaluation result is described.

[Gloss]

The gloss was evaluated by measuring the mirror surface gloss value of the testing bumper at 60° with a gloss meter in accordance with JIS-Z8741. If the gloss value exceeds 70%, the same gloss as that of a coated product is obtained. So this value of 70% was used as an index.

As Table 16 shows, using the skin-forming PPs having ethylene contents of 6 wt. % or less (T-1, T-2 and T-3), resulted in gloss values exceeding 70%. Such skin-forming PPs with high crystallization, i.e., high Rockwell hardness, measured greater gloss value.

[Appearance]

The appearance was evaluated by observing the testing bumpers with a naked eye. The bumper was first graded if its appearance quality was equivalent to or better than a coated product. It was second graded if the appearance quality was slightly inferior to that of a coated product. It was third graded if the appearance quality was far inferior to that of a coated product. The first and the second grades were set as a target.

The evaluation results like the gloss testing results show that the skin-forming PPs using the samples S-1, S-2 and S-3 measured excellent appearance quality. Especially, the skin-forming PPs using the samples S-1 and S-2 resulted in the best appearance quality, comparable to that of a coated product.

[Scratch resistance]

The scratch resistance was evaluated according to JIS-K5401 with a surface testing machine manufactured by Shinto Kagaku Co., Ltd. More specifically, an iron pin (diameter:2 mm φ) was set to be directed at 45° to the testing bumper. Then a load of 100 g was applied to the pin so as to scratch the bumper surface at a constant speed of 150 mm/s. The resultant scratching of the bumper was evaluated and graded as follows.

The bumper having almost no scratching was first graded. The bumper having minimal scratching was second graded. The bumper having some scratching was third graded. The bumper having many scratches was fourth graded. The first and the second grades were set as a target.

Referring to Table 16, the skin-forming PPs using the samples S-1, S-2 and S-3 measured excellent scratch resistance, as being second or first graded. Especially the skin-forming PPs using the samples S-1 and S-2 resulted in essentially no scratches, thus presenting excellent scratch resistance.

The test bumpers T-4, T-5 and T-6, using the S-4, S-5 and G-3 samples, respectively, as the skin-forming material, presented inferior results. The test bumper T-6 employing the sample G-3 used the core-forming material for its skin layer (Table 13).

[Low temperature impact resistance]

Low temperature impact resistance testing was executed by keeping the test corner bumpers at an ambient temperature of −30° C. for 3 hours. Then a steel ball (diameter: 50 mm φ, weight:1 kg) was dropped from a measured height so as to determine the drop height necessary to cause bumper breakage or cracking. The low temperature impact strength was expressed in units of N-m.

Test bumpers F-1 to F-4 and comparative test bumpers H-1 to H-5 were prepared using the skin-forming and the core-forming materials listed in Table 17. The comparative test bumper H-1 was formed of the core and the skin layers by using only the same skin-forming material S-1 as sample T-1 listed in Table 16.

The steel ball was dropped so as to hit each bumper surface twice at 3 points; upper surface A, side surface B and rear surface C. The measurement values were obtained from averaging the respective 2 measurement values at the 3 points.

As Table 17 shows, the samples F-1–F-4 of the present invention presented high impact strength at a low temperature, i.e., 9.8 N-m or greater, while the comparative sample H-1 using the skin-forming material T-1 (Table 16) for both the skin and core layers showed a remarkably low impact strength at low temperature.

Although the comparative sample H-2 had a sandwich construction composed of a skin layer and a core layer and employed the same skin-forming material as those of samples F-1–F4, the resultant low temperature impact strength was relatively low.

Although the comparative samples H-3, H-4 and H-5 used the same skin-forming materials as those of samples F-1 to F-4 of the present invention, the resultant low temperature impact strength was lower than 7.8 N-m, thus being inferior to the testing bumpers F-1 to F-4 of the present invention.

In summary, the test bumpers using the skin-forming PPs of the S-1, S-2 and S-3 materials showed excellent quality represented by gloss, appearance and scratch resistance, while the test bumpers using the skin-forming PPs of the S-4 and S-5 materials having ethylene contents of 7.3 wt. % or more failed to provide excellent appearance quality comparable to that of a coated product.

Since the sample H-1 was formed of the S-1 material only, it resulted in good appearance quality (T-1 in Table 16), but inferior low temperature impact strength, thus failing to meet the requirement of a bumper for an automobile.

The test bumpers (F1–F4 in Table 17) using rubber modified PPs (containing EPR) of G-1 to G-4 as the core-forming materials showed high impact strength at low temperature.

As aforementioned, the present invention provides a bumper having gloss, metallic luster and scratch resistance as excellent as that of a coated product, thus eliminating a coating process. This bumper is also provided with excellent impact resistance.

TABLE 17

| (Evaluation low temperature impact resistance) | | | |
|---|---|---|---|
| Sample | Material | | Low temperature impact value |
| No. | Skin layer | Core layer | (N · m) |
| Comparative examples H-1 | T-1 | | 2.0 |
| H-2 | T-1 | G-8 | 5.8 |
| Examples F-1 | ↑ | G-1 | >9.8 |
| F-2 | ↑ | G-2 | >9.8 |
| F-3 | ↑ | G-3 | >9.8 |
| F-4 | ↑ | G-4 | 9.8 |
| Comparative examples H-3 | ↑ | G-5 | 7.8 |
| H-4 | ↑ | G-8 | 4.9 |
| H-5 | ↑ | G-7 | 6.8 |

Example 7

This example varied Izod impact strength (J/m)(notched) at −30° C. and flexural modulus (MPa) of the core-forming material and tested low temperature impact resistance of a bumper having a sandwich construction formed of a skin layer covering the core layer in the same manner as in example 6.

Figure 13:
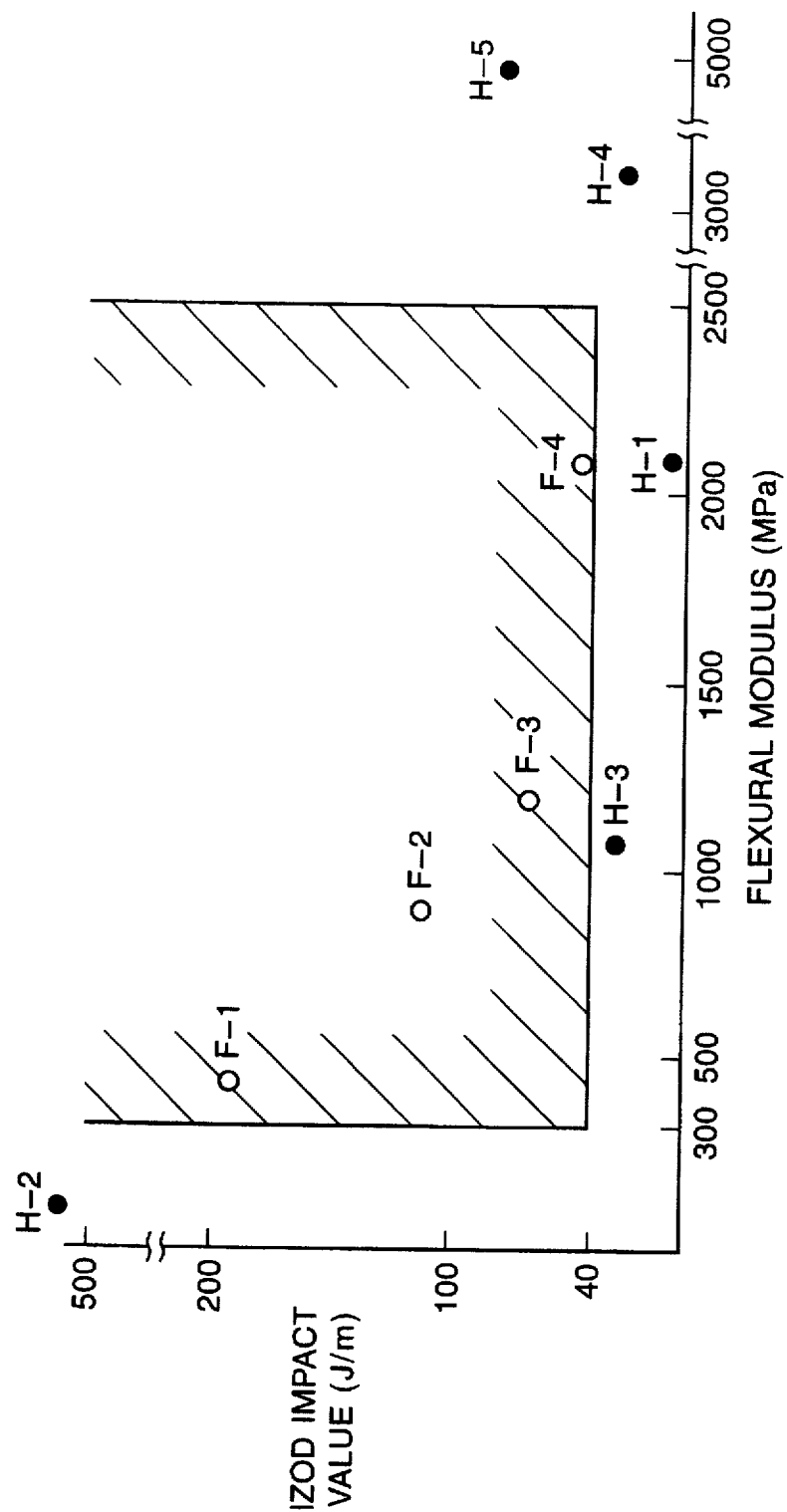
FIG. 13 is a graphical representation of the relationship between the Izod impact strength (notched) and flexural modulus of a core layer of the molded resin of the present invention.

The low temperature impact strength of the bumper was measured in the same manner as in Example 6 so as to determine whether the bumper had a low temperature impact strength of 9.8 N-m or greater, meeting the bumper requirement. The measurement results are shown in FIG. 13. The skin-forming materials used were the same as the sample S-1 listed in Table 14 of Example 6.

FIG. 13 is a graphical representation showing the relationship between measurement results of the flexural modulus (MPa) as the abscissa and the Izod impact strength (notched) at −30° C. as the ordinate. The samples falling into the range presenting an Izod impact strength of 40 J/m or greater and a flexural modulus from 300 to 2500 MPa (samples F-1 to F-4) measured low temperature impact strength of 9.8 N-m or greater and passed. The samples F-1 to F-4 and H-1 to H-5 correspond with those listed in Table 17.

The samples H-1 and H-3 had a flexural modulus within the pass range, however, they failed because they had insufficient minimum breakage strength to absorb energy, due to low Izod impact strength (notched). Although the sample H-2 had high Izod impact strength of 500 J/m or greater, it also failed because of low flexural modulus of 100 MPa or less, which tends to cause a large degree of deformation. Although the sample H-4 had a high flexural modulus of 3300 MPa or greater and a rigid core layer, it failed because of insufficient Izod impact strength (notched) to absorb energy, which tends to cause cracking in the skin layer. Although the sample H-5 had a high Izod impact strength of 75 J/m, it failed because of high flexural modulus of 4800 MPa, which tends to cause deformation of the skin layer. The sample H-1 is a bumper having a core and a skin layer formed of the skin-forming material (T-1) only, so its values of Izod impact strength (notched) and flexural modulus represented characteristics of the skin-forming material itself.

What is claimed is:

1. A molded resin comprising an inner core layer and an outer skin layer, said core layer comprising a polypropylene composite material, and said skin layer comprising a mixture of a polypropylene resin and a coloring agent, wherein said polypropylene resin of said skin layer contains an amount of ethylene co-monomer about 6 parts by weight or less based on 100 parts by weight of the polypropylene resin of said skin layer, and has a Rockwell hardness equal to or greater than about 85.

2. A molded resin as in claim 1, wherein said polypropylene composite material of said core layer comprises a polypropylene resin containing one or both of a rubber and an inorganic filler.

3. A molded resin as in claim 2, wherein said rubber is selected from the group consisting of amorphous ethylene-α-olefin copolymer and styrene thermoplastic elastomer.

4. A molded resin as in claim 2, wherein said inorganic filler is selected from the group consisting of glass fiber, talc, mica, calcium carbonate, wollastonite, clay, barium sulfate, potassium titanate whisker, magnesium sulfate whisker, calcium carbonate whisker and silica.

5. A molded resin as in claim 1, wherein said skin layer further comprises about 0.1–3 parts by weight based on 100 parts by weight of the polypropylene resin of said skin layer of a glitter pigment with an average particle size of about 5 μm or more.

6. A molded resin as in claim 5, wherein said glitter pigment is selected from the group consisting of metal powder pigment and pearl pigment.

7. A molded resin as in claim 5, wherein said skin layer has an outermost surface and further comprises a clear layer having a thickness of about 25 μm or more formed within said skin layer at said outermost surface, and wherein said glitter pigment is contained within said skin layer below said clear layer.

8. A molded resin as in claim 1, wherein said skin layer further comprises one or both of a first light stabilizer formed as a hindered amine light stabilizer with a molecular weight of less than about 1500 and a melting point about 100° C. or higher and a second light stabilizer formed as a hindered amine light stabilizer with a molecular weight of about 1500 or more.

9. A molded resin as in claim 8, wherein the total amount of one or both of said first light stabilizer and said second light stabilizer is about 0.05–2.0 parts by weight based on 100 parts by weight of the polypropylene resin of said skin layer.

10. A molded resin as in claim 1, wherein said polypropylene composite material of said core layer comprises a polypropylene resin containing one or both of a rubber and an inorganic filler, said core layer having an Izod impact strength (notched) (−30° C.) of about 40 J/m or greater and a flexural modulus ranging from about 300 to about 2500 MPa.

11. A molded resin as in claim 8, in the form of an automobile bumper.

12. A molded resin as in claim 5, in the form of an automobile bumper.

13. A molded resin as in claim 1 in the form of an automobile bumper, wherein said polypropylene composite material of said core layer comprises a polypropylene resin containing one or both of a rubber and an inorganic filler, said core layer having an Izod impact strength (notched) (−30° C.) of about 40 J/m or greater and a flexural modulus ranging from about 300 to about 2500 MPa.

14. A bumper as in claim 13, wherein said rubber is selected from the group consisting of amorphous ethylene-α-olefin copolymer and styrene thermoplastic elastomer.

15. A bumper as in claim 13, wherein said inorganic filler is selected from the group consisting of glass fiber, talc, mica, calcium carbonate, wollastonite, clay, barium sulfate, potassium titanate whisker, magnesium sulfate whisker, calcium carbonate whisker and silica.

16. A molded resin comprising an inner core layer and an outer skin layer; said skin layer comprising a polypropylene resin containing an amount of ethylene co-monomer about 6 parts by weight or less based on 100 parts by weight of the polypropylene resin of said skin layer, one or both of a first light stabilizer formed as a hindered amine light stabilizer with a molecular weight of less than about 1500 and a melting point about 100° C. or higher and a second light stabilizer formed as a hindered amine light stabilizer with a molecular weight of about 1500 or more, and a coloring agent; and said core layer comprising a polypropylene composite material containing one or both of a rubber and an inorganic filler, said core layer having an Izod impact strength (notched) (−30° C.) of about 40 J/m or greater and a flexural modulus ranging from about 300 to about 2500 Mpa.

17. A molded resin as in claim 16, wherein said skin layer further comprises about 0.1–3 parts by weight based on 100 parts by weight of the polypropylene resin of said skin layer of a glitter pigment with an average particle size of about 5 μm or more.

18. A molded resin as in claim 1, wherein said skin layer further comprises one or both of a first light stabilizer formed as a hindered amine light stabilizer with a molecular weight of less than 1500 and a melting point about 100° C. or higher and a second light stabilizer formed as a hindered amine light stabilizer with a molecular weight of 1500 or more.

19. A molded resin as in claim 18, wherein said first light stabilizer is selected from the group consisting of 1-[2-[3-(3,5-di-t-butyl-4-hydroxyphenyl)propyonyloxy]ethyl]-4-[3-

(3,5-di-t-butyl-4-hydroxyphenyl)propyonyloxy]-2,2,6,6-tetramethylpiperidine, and 2-methyl-2-(2,2,6,6-tetramethyl-4-piperidine)amino-N (2,2,6,6-tetramethyl-4-piperidil) propionateamide; and said second light stabilizer is selected from the group consisting of polycondensate of succinic acid dimethyl-1-(2 hydroxy ethyl)-4-hydroxy-2,2,6,6-tetramethylpiperidine, poly[{6-(1,1,3,3-tetramethyl butyl) imino-1,3,5-triazine-2,4-diyl} {(2,2,6,6-tetramethyl-4 piperidil)imino} hexamethylene{(2,2,6,6-tetra methyl-4-piperidil)imino}], and N,N'-bis(3-amino propyl)ethylene diamine-2,4-bis[N-butyl-N-(1,2,2,6,6-pentamethyl-4 piperidil)amino]-6-chloro-1,3,5-triazine condensate.

20. A molded resin comprising an inner core layer and an outer skin layer; said skin layer comprising a polypropylene resin containing an amount of ethylene co-monomer about 6 parts by weight or less based on 100 parts by weight of the polypropylene resin of said skin layer, one or both of a first light stabilizer formed as a hindered amine light stabilizer with a melting point about 100° C. or higher and a second light stabilizer formed as a hindered amine light stabilizer, and a coloring agent; and said core layer comprising a polypropylene composite material containing one or both of a rubber and an inorganic filler, said core layer having an Izod impact strength (notched) (−30° C.) of about 40 J/m or greater and a flexural modulus ranging from about 300 to about 2500 MPa.

21. A molded resin as in claim 20, wherein said first light stabilizer is selected from the group consisting of 1-[2-[3-(3,5-di-t-butyl-4-hydroxyphenyl)propyonyloxy]ethyl]-4-[3-(3,5-di-t-butyl-4-hydroxyphenyl)propyonyloxy]-2,2,6,6-tetramethylpiperidine, and 2-methyl-2-(2,2,6,6-tetramethyl-4-piperidine)amino-N (2,2,6,6-tetramethyl-4-piperidil) propionateamide; and said second light stabilizer is selected from the group consisting of polycondensate of succinic acid dimethyl-1-(2 hydroxy ethyl)-4-hydroxy-2,2,6,6-tetramethylpiperidine, poly[{6-(1,1,3,3-tetramethyl butyl) imino-1,3,5-triazine-2,4-diyl} {(2,2,6,6-tetramethyl-4 piperidil)imino} hexamethylene{(2,2,6,6-tetra methyl-4-piperidil)imino}], and N,N'-bis(3-amino propyl)ethylene diamine-2,4-bis[N-butyl-N-(1,2,2,6,6-pentamethyl-4 piperidil)amino]-6-chloro-1,3,5-triazine condensate.

* * * * *